United States Patent Office 2,739,403
Patented Mar. 27, 1956

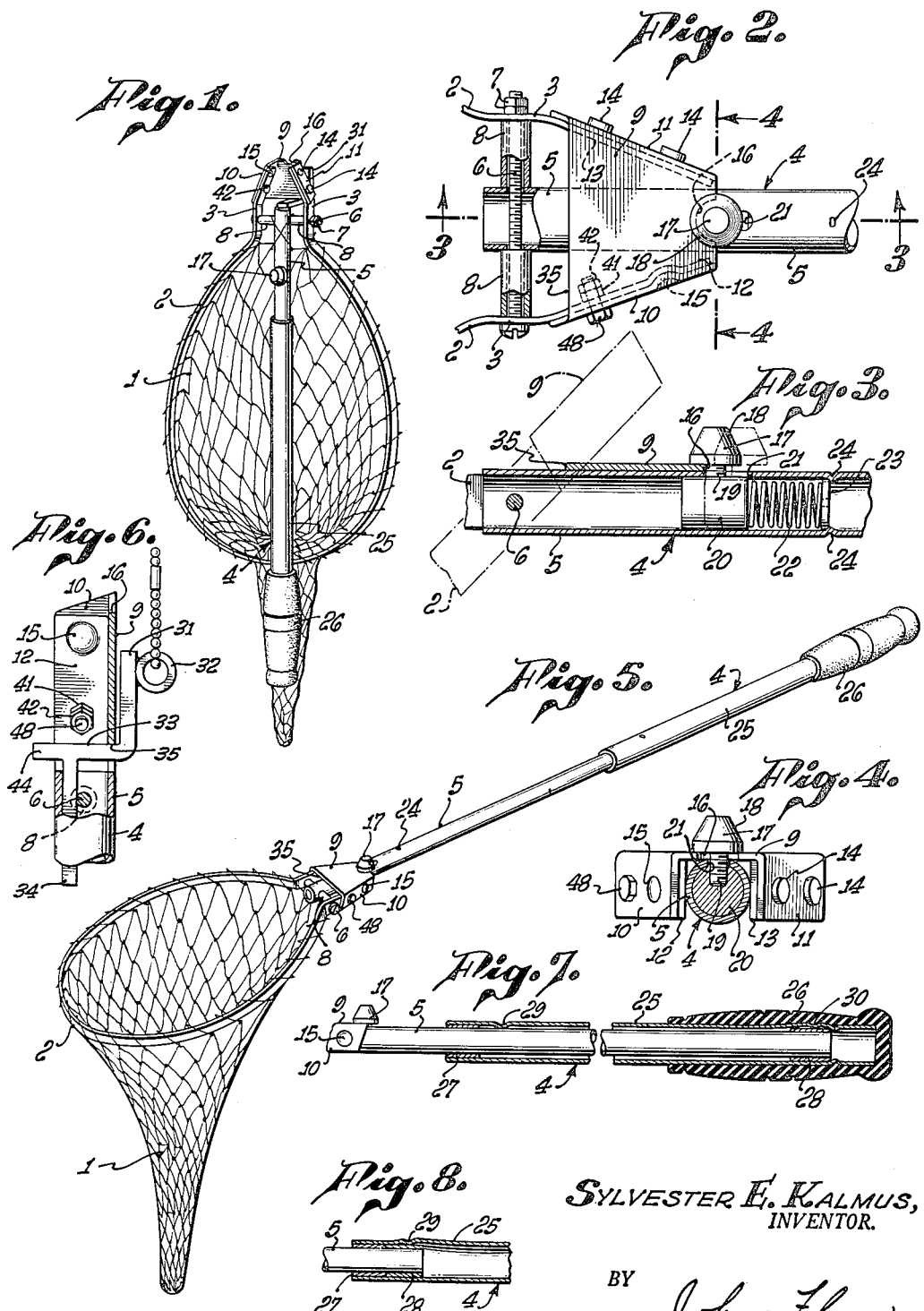

2,739,403
COLLAPSIBLE LANDING NET

Sylvester E. Kalmus, Burbank, Calif., assignor to Remle Musical Products, Inc., Encino, Calif., a corporation of California Application November 4, 1950, Serial No. 194,140

2 Claims. (Cl. 43—12)

This invention relates to a landing net for use in fishing, and particularly to a net that may be folded when not in use.

It is one of the objects of this invention to provide a light, readily portable landing net that is simple to manufacture and that, when collapsed, can be quickly placed in condition for use.

It is another object of this invention to make it possible to hang the collapsed net upon a support, such as the belt of the user, and yet that can be easily removed from such support whenever it is desired to use the net.

It is still another object of this invention to make it possible to replace the net proper on its frame in a simple and expeditious manner.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a pictorial view showing the landing net in folded position;

Fig. 2 is an enlarged, fragmentary view, partially in section, showing the manner in which the net frame may be latched in extended position;

Fig. 3 is a sectional view, taken along a plane corresponding to line 3—3 of Fig. 2;

Fig. 4 is a sectional view, taken along a plane corresponding to line 4—4 of Fig. 2;

Fig. 5 is a pictorial view showing the landing net in fully extended position;

Fig. 6 is a fragmentary, sectional view showing the manner in which the folded net structure may be supported, as, for example, on the belt of the user;

Fig. 7 is a fragmentary view of the handle member shown in collapsed position; and Fig. 8 is a fragmentary view of the handle, showing the telescoping parts in fully extended position.

The net proper 1 is shown as supported by a net frame 2 (Figs. 1 and 5) that may be of generally elliptical configuration. This net frame 2 is provided with the projecting ends 3, by the aid of which it may be pivotally jointed to a handle structure 4. This handle structure includes an inner tubular member 5.

Transversely of the tubular member 5 there is arranged a bolt 6 which extends through appropriate apertures in the projections 3, and which is held in assembled relation by the aid of the nuts 7. Bushings 8 on each side of the tubular member 5 serve as spacers between this member 5 and the projections 3. The bolt 6 passes through clearance apertures in the tubular member 5 adjacent its opening. The bushings 8 are not confined against angular movement by the bolt 6. Accordingly, the net frame 2 can be swung about the axis of the bolt 6, as a pivot, to the collapsed position of Fig. 1, or to the extended position of Fig. 5.

In order to maintain the frame 2 in the extended position of Fig. 5, a latch mechanism is provided. Thus, there is a plate 9 (see, particularly, Fig. 4) that has edge flanges 10 and 11 converging in a direction away from the pivot of the frame 2. These flanges 10 overlie the corresponding converging extensions 12 and 13 of the frame 2. Flange 11 is permanently attached to extension 13, as by two rivets 14. Flange 10 is detachably attached to extension 12, as by the bolt 40 and nuts 41 and 42. Cooperating dimples 15 on the flange 10 and extension 12 serve to maintain these parts in proper overlying relation.

When it is desired to remove net 1 on its frame 2, it is merely necessary to remove the lock nut 42, the nut 41, and the bolt 40, and to disengage the extension 12 from flange 10. The net 1 may then be slipped over this extension, and a new one substituted. The flange 10 and extension 12 may then be readily reassembled.

As shown most clearly in Fig. 3, the plate 9 overlies the handle member 5 when the net frame is in operative position. Its right-hand edge is provided with an arcuate slot 16 (see Fig. 1) forming a latching edge. The plate 9 is adapted to be latched underneath the head 17 of the latching member. This head 17 has a tapered surface 18, and has a threaded shank 19 (Fig. 4) threaded into a cylindrical plug 20 freely slidable within the tubular member 5. An elongated slot 21, in the upper side of the tubular member 5, permits passage of the shank 19. The latch member 17 is urged to the left into latch-engaging position, as illustrated in Fig. 3, by the aid of a compression spring 22. This compression spring abuts, at its right-hand end, a washer 23. This washer 23 is restrained against movement toward the right by the aid of a pair of dimples 24 pressed into the tubular member 5.

To release the net frame from the latch in the extended position of Figs. 3 and 5, the head 18 can be urged toward the right to assume the dot-and-dash position illustrated in Fig. 3. This manual movement is opposed by the compression spring 22. As soon as the latch 17 moves beyond the arcuate slot 16, the frame 2 can be folded to the position of Fig. 1.

The tubular member 5 is arranged to telescope in an outer tubular member 25 (Figs. 7 and 8). This tubular member, as shown most clearly in Fig. 7, can be provided with a rubber grip 26. The outer tubular member 25 is provided, at its left-hand end, with a sleeve 27 which may be press-fitted into the outer tubular member 25. Similarly, the inner tubular member 5, at its right-hand extremity, is provided with a sleeve 28 that is press-fitted over the tubular member 5. Accordingly, when the telescoping handle members 5 and 25 are in fully extended position, the sleeves 27 and 28 abut as illustrated in Fig. 8.

In order frictionally to restrain the telescoping members 5 and 25, whether in the collapsed position of Fig. 7 or in the extended position of Fig. 8, the outer tubular member 25 is provided with a pair of spaced dimples 29 and 30. In the collapsed position of Fig. 7, the dimple 30 rides over the sleeve 28, and frictionally grips it. In the fully extended position of Fig. 8, dimple 29 similarly frictionally grips the sleeve 28. Accordingly, when carried in the collapsed position of Fig. 1, or in the extended position of Fig. 5, there is a frictional resistance against relative telescoping movement between the two tubular elements 5 and 25.

When the net structure is in the fully collapsed position of Fig. 1, it may readily be carried by the aid of a supporting bracket or leg 31, shown most clearly in Figs. 1 and 6. This supporting bracket is provided with an eye 32 through which a flexible chain 50 may pass for engagement with the belt of the person using the net. In the position of Fig. 6, the body of the person is disposed to the right of the net.

The support 31 is provided with a horizontal portion 33 and a downwardly extending portion 34. The lower edge 35 of the plate 9 rests upon the upper surface of the horizontal member 33. The portion 34 is inserted into the space between bolt 6 and the inner wall of handle member 5, on that side of the bolt which is farther from the plate 9. In this way, the left hand edge 44 extends beyond the inner edges of extension 12 and 13.

When it is desired to remove the net structure from the support 31, the handle 4 is swung, in a clockwise direction, away from the body of the user, about the axis provided by the bolt 7 (see Fig. 6), so that it extends horizontally away from the body of the user. The handle 4 carries with it the bracket 31. The net proper 1 remains close to the body of the operator. In this movement, the lower edge 35 of plate 9 is cleared by the left-hand edge 44 of the horizontal member 33; and the bracket 31 is moved to a position in which the member 33 is substantially vertical. From this position, and then the entire net structure can be moved outwardly by drawing the net structure away from the body and off the extension 34. The bracket 31 remains suspended from the belt of the operator. Then the handle 4 can be snapped downwardly from its horizontal position, to cause the latch 17 to engage the plate 9. In this movement, the arcuate slot 16 engages the tapered surface 18 to move the latch 17 to the right against the force of spring 22 (as viewed in Fig. 2). Then as the edge of slot 16 passes below the latch 17, this latch is moved to latching position by spring 22.

The inventor claims:

1. In a folding net structure: a handle member having a hollow end; a net frame pivoted adjacent the hollow end; a plate carried by the frame and having an edge in a plane above and substantially in alignment with the hollow end when the frame is in folded position; and a removable support for the net when in folded position, having one portion, engaging said edge and having another portion projecting at an angle from the first portion, and extending into the hollow end.

2. In a suspension means for a folding fishing net structure having a hollow handle pivoted to the net frame, said frame being provided with a member, and edge of which is above and substantially in alignment with the hollow end of the handle when the handle is in folded position: a support having a leg upon which the edge of the member is adapted to rest when the net frame is in a folded position; said support also having a portion projecting at an angle from the leg and adapted to extend into the hollow end.

References Cited in the file of this patent

UNITED STATES PATENTS

| | | |
|---|---|---|
| 619,065 | Bjornsen | Feb. 7, 1899 |
| 771,362 | Ellsworth | Oct. 4, 1904 |
| 932,170 | Pihl | Aug. 24, 1909 |
| 1,024,653 | Sargent | Apr. 30, 1912 |
| 1,391,841 | Lewis | Sept. 27, 1921 |
| 1,726,715 | Powell | Sept. 3, 1929 |
| 1,894,192 | Olson | Jan. 10, 1933 |
| 2,066,439 | Wine et al. | Jan. 5, 1937 |
| 2,212,756 | Stewart | Aug. 27, 1940 |
| 2,310,011 | Cave et al. | Feb. 2, 1943 |
| 2,455,765 | Harvey | Dec. 7, 1948 |
| 2,463,621 | Herzog | Mar. 8, 1949 |
| 2,637,133 | Ross | May 5, 1953 |

FOREIGN PATENTS

| | | |
|---|---|---|
| 9,804 | Great Britain | 1895 |
| 26,051 | Great Britain | Apr. 5, 1930 |
| 420,378 | France | Nov. 22, 1910 |
| 425,565 | Great Britain | Mar. 18, 1935 |